US012188461B2

(12) United States Patent
Benistand-Hector et al.

(10) Patent No.: US 12,188,461 B2
(45) Date of Patent: Jan. 7, 2025

(54) COMPRESSION APPARATUS AND FILLING STATION COMPRISING SUCH AN APPARATUS

(71) Applicant: L'Air Liquide, Societe Anonyme pour l'Etude et l'Exploitation des Procedes Georges Claude, Paris (FR)

(72) Inventors: Cyril Benistand-Hector, Sassenage (FR); Guillaume Petitpas, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 212 days.

(21) Appl. No.: 17/800,995

(22) PCT Filed: Oct. 21, 2020

(86) PCT No.: PCT/EP2020/079586
§ 371 (c)(1),
(2) Date: Aug. 19, 2022

(87) PCT Pub. No.: WO2021/164901
PCT Pub. Date: Aug. 26, 2021

(65) Prior Publication Data
US 2023/0085780 A1    Mar. 23, 2023

(30) Foreign Application Priority Data

Feb. 21, 2020   (FR) ...................................... 2001726

(51) Int. Cl.
*F04B 15/08*    (2006.01)
*F04B 3/00*     (2006.01)
(Continued)

(52) U.S. Cl.
CPC ................ *F04B 15/08* (2013.01); *F04B 3/00* (2013.01); *F04B 7/04* (2013.01); *F04B 23/023* (2013.01);
(Continued)

(58) Field of Classification Search
CPC .. F04B 15/08; F04B 2015/081; F04B 53/162; F04B 53/12; F04B 7/04; F04B 3/00; F04B 23/023
See application file for complete search history.

(56) References Cited

U.S. PATENT DOCUMENTS 3,136,136 A    6/1964  Gottzmann
4,369,633 A    1/1983  Snyder
(Continued)

FOREIGN PATENT DOCUMENTS

EP    1 030 971    8/2000
JP    S48 5283     1/1973
(Continued)

OTHER PUBLICATIONS

International Search Report and Written Report for PCT/EP2020/079586, mailed Nov. 6, 2020.
French Search Report for FR 2 001 726, mailed May 7, 2020.

*Primary Examiner* — Filip Zec
(74) *Attorney, Agent, or Firm* — Elwood L. Haynes

(57) ABSTRACT

The invention relates to a fluid compression apparatus having a plurality of compression stages, comprising a first compression chamber, a second compression chamber, an intake system communicating with the first compression chamber which is configured to allow fluid to be compressed into said first compression chamber, a transfer system configured to allow in an open position the transfer of fluid from the first compression chamber to the second compression chamber, a mobile piston for ensuring the compression of the fluid in the first and second compression chambers. The (Continued)

apparatus further comprises a discharge port which communicates with the second compression chamber and is configured to allow the exit of compressed fluid, the piston being translationally mobile in a longitudinal direction, wherein the first compression chamber is defined by a fixed lower cavity, a lower end of the piston and a first sealing system formed between the piston and a wall of the cavity, wherein the second compression chamber is defined by a fixed upper cavity, an upper end of the piston and a second sealing system formed between the piston and a wall of the upper cavity. The invention is characterized in that, in the operating configuration of the apparatus, the longitudinal direction of translation of the mobile piston is vertical, the intake system being located at a lower end of the apparatus and the discharge port being located in an upper part of the apparatus above the transfer system.

11 Claims, 9 Drawing Sheets

(51) Int. Cl.
    *F04B 7/04*     (2006.01)
    *F04B 23/02*    (2006.01)
    *F04B 53/12*    (2006.01)
    *F04B 53/16*    (2006.01)
(52) U.S. Cl.
    CPC ............ *F04B 53/12* (2013.01); *F04B 53/162* (2013.01); *F04B 2015/0814* (2013.01); *F04B 2015/082* (2013.01); *F04B 2015/0824* (2013.01); *F04B 2015/0826* (2013.01)

(56) References Cited

U.S. PATENT DOCUMENTS

| | | | |
|---|---|---|---|
| 4,639,197 A | 1/1987 | Tornare et al. | |
| 5,511,955 A | 4/1996 | Brown et al. | |
| 5,593,288 A | 1/1997 | Kikutani | |
| 7,410,348 B2 | 8/2008 | Chalk et al. | |
| 10,087,896 B1* | 10/2018 | Perez | F02D 41/26 |
| 11,205,133 B2* | 12/2021 | Amini | G06N 10/00 |
| 11,628,387 B2* | 4/2023 | Garner | B01D 35/0273 |
| | | | 62/50.6 |
| 2018/0180035 A1* | 6/2018 | Popadiuc | F04B 19/22 |
| 2018/0266405 A1* | 9/2018 | Foege | F04B 39/06 |
| 2020/0116143 A1* | 4/2020 | Boerema | F04B 3/00 |
| 2021/0164455 A1* | 6/2021 | Hillebrand | F04B 9/111 |
| 2021/0180751 A1* | 6/2021 | Patel | F17C 7/02 |
| 2021/0332950 A1* | 10/2021 | Petitpas | F04B 53/144 |
| 2022/0074397 A1* | 3/2022 | Crispel | F04B 15/08 |
| 2022/0196151 A1* | 6/2022 | Okada | F16J 9/26 |
| 2022/0282718 A1* | 9/2022 | Hewitt | F04B 15/02 |

FOREIGN PATENT DOCUMENTS

| | | |
|---|---|---|
| JP | S55 179 849 | 12/1980 |
| JP | H81 44963 | 6/1996 |
| JP | 2008 196 590 | 8/2008 |
| JP | 2012 163 105 | 8/2012 |
| JP | 2012 167 767 | 9/2012 |

* cited by examiner

[FIG.1]
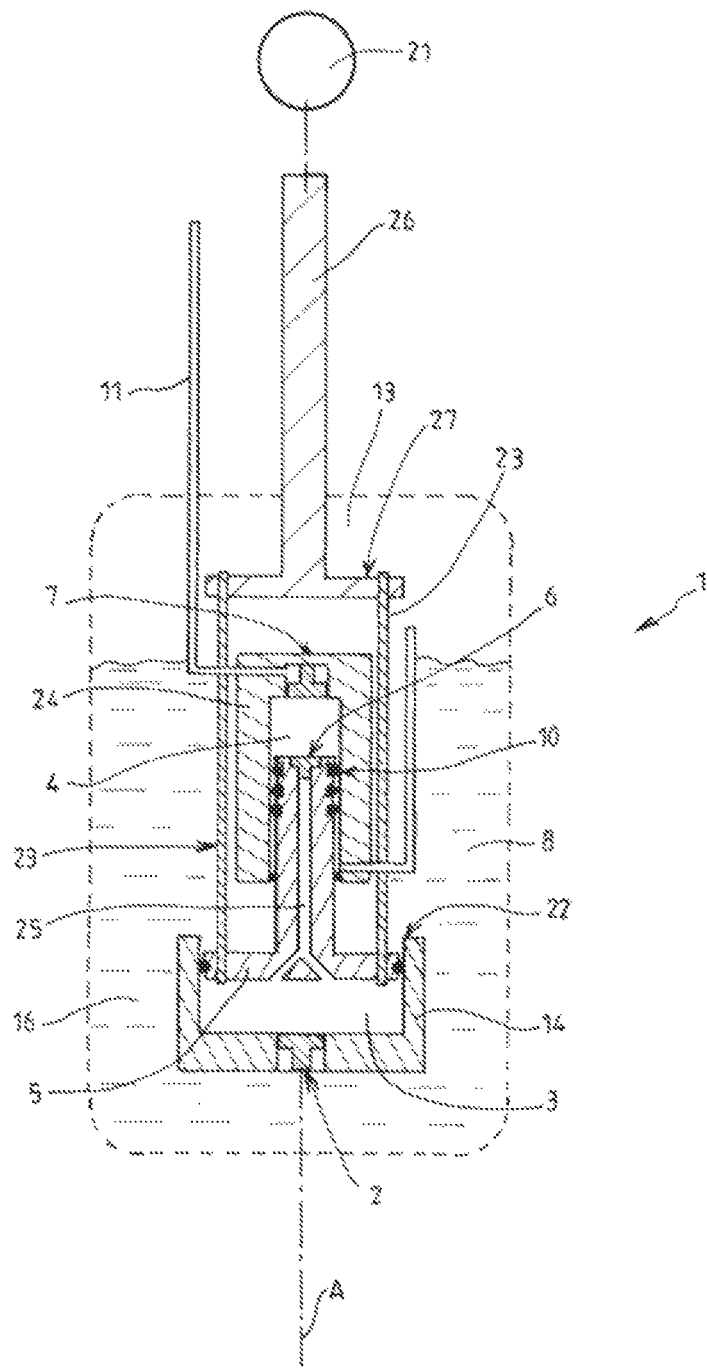

[FIG.2]
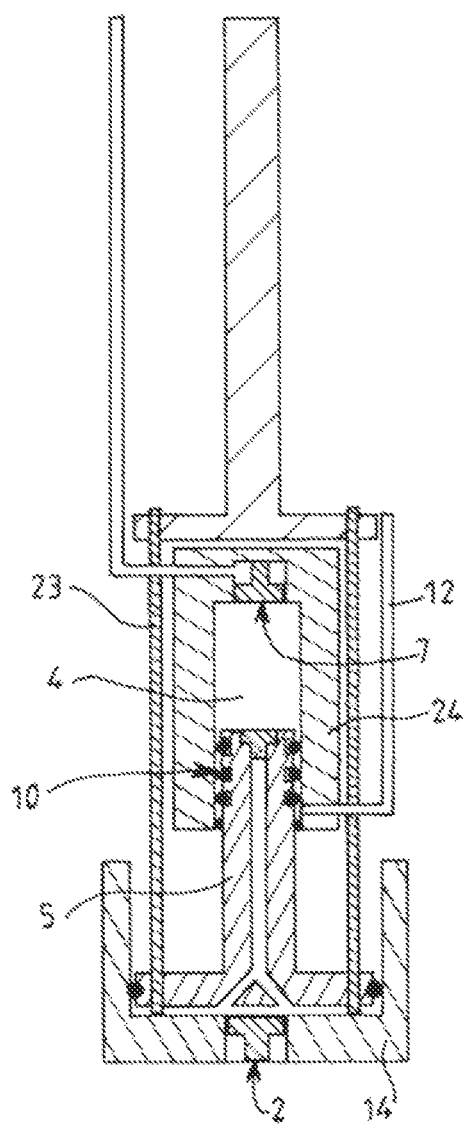

[FIG.3]
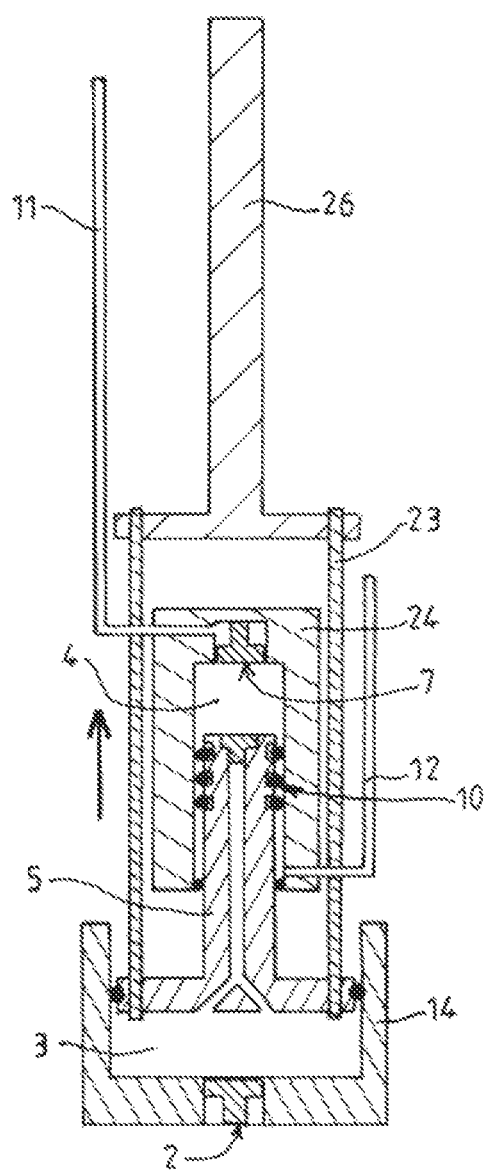

[FIG.4]
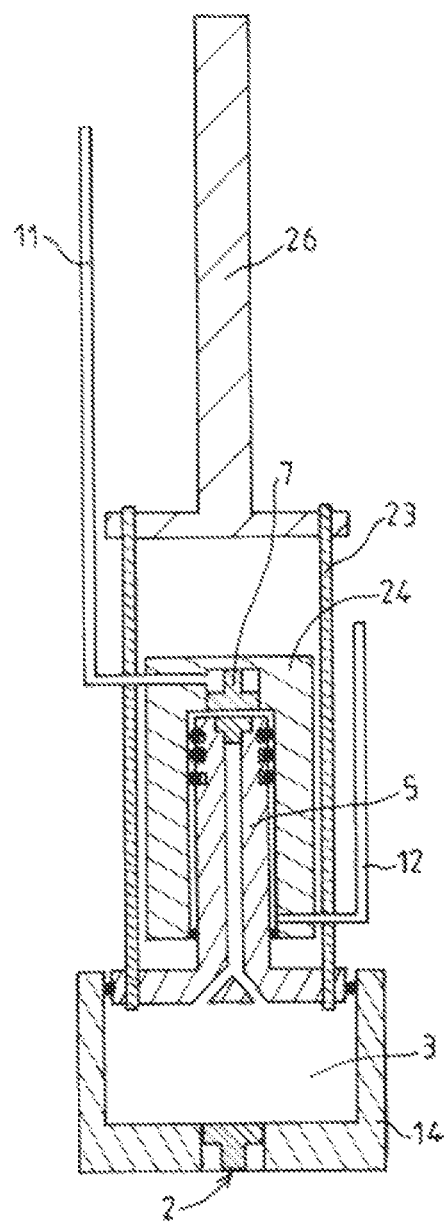

[FIG.5]
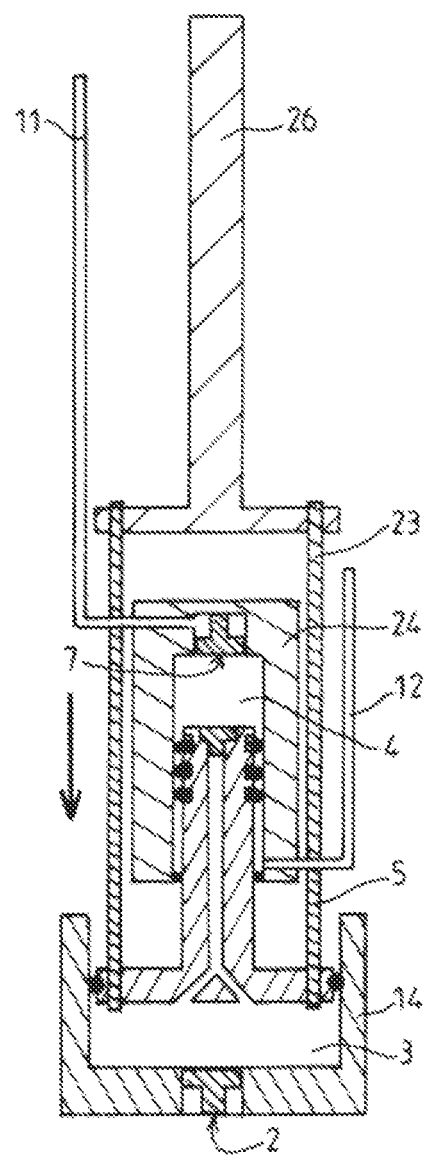

[FIG.6]
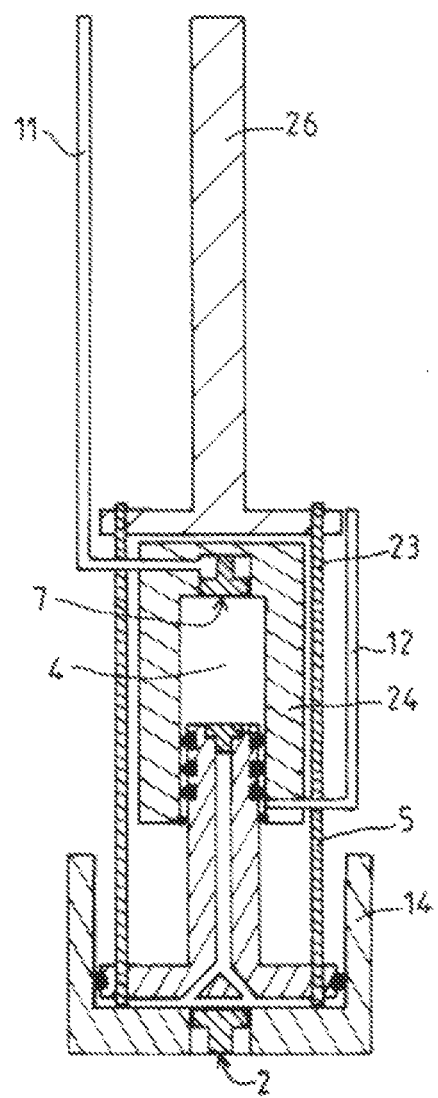

[FIG.7]
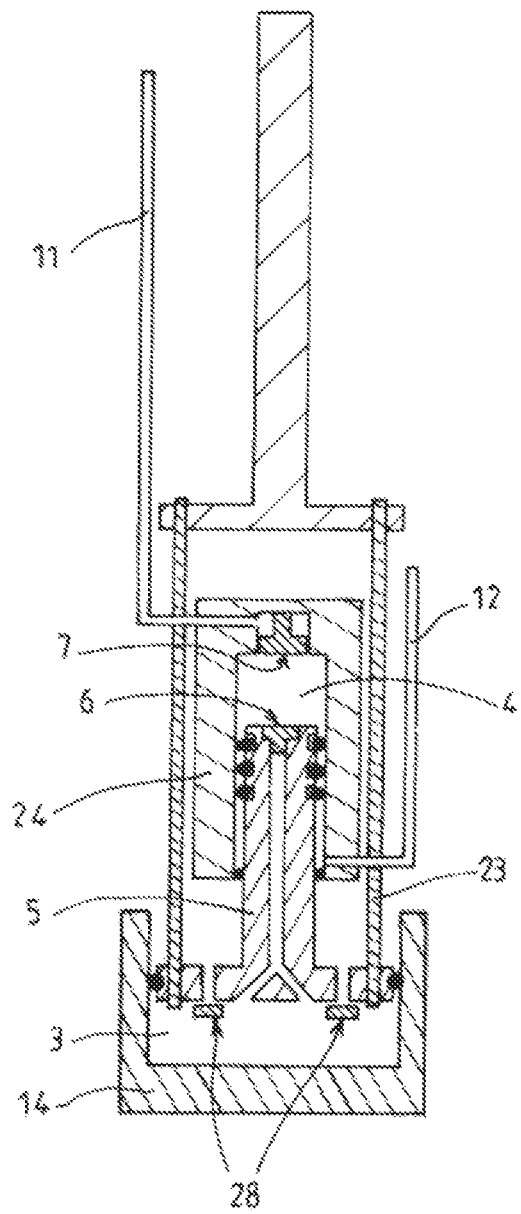

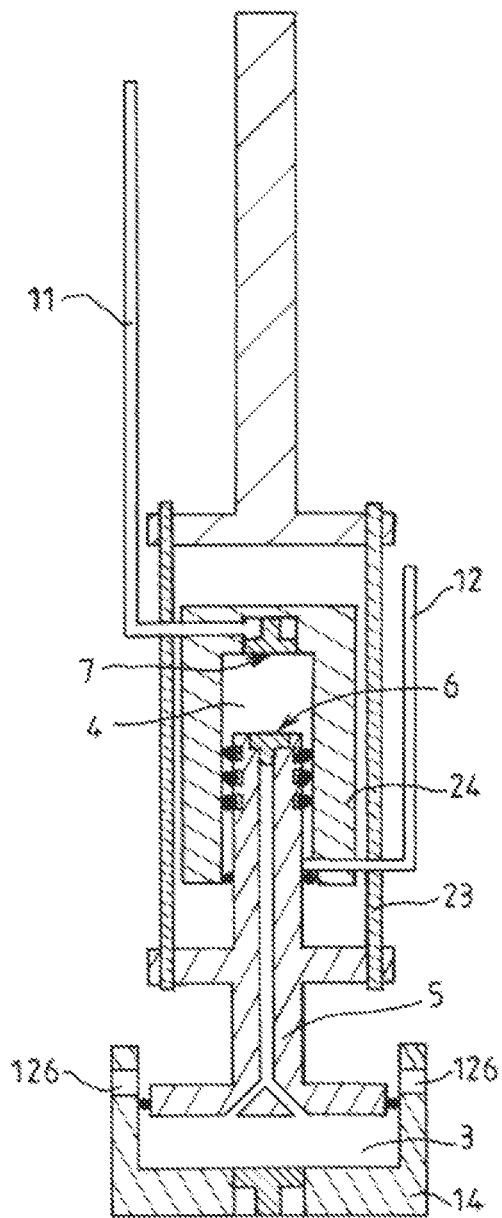
[FIG.8]

[FIG.9]
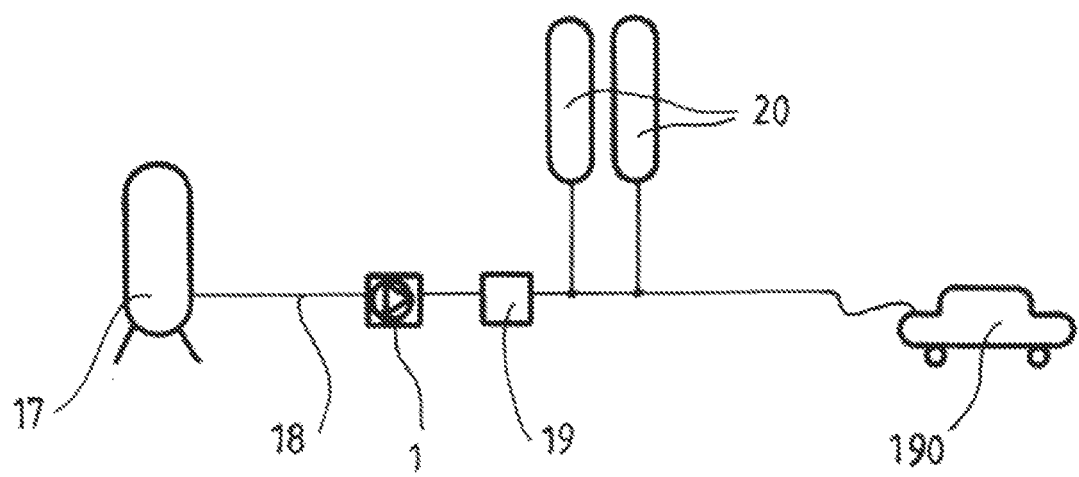

COMPRESSION APPARATUS AND FILLING STATION COMPRISING SUCH AN APPARATUS

CROSS-REFERENCE TO RELATED APPLICATIONS

This application is a § 371 of International PCT Application PCT/EP2020/079586, filed Oct. 21, 2020, which claims § 119(a) foreign priority to French patent application FR 2001726, filed Feb. 21, 2020.

BACKGROUND

Field of the Invention

The invention relates to a cryogenic fluid compression apparatus, and to a filling station comprising such an apparatus.

The invention relates more particularly to a fluid-compression apparatus with multiple compression stages, comprising a first compression chamber, a second compression chamber, an intake system that communicates with the first compression chamber and is configured to allow the admission of fluid to be compressed into said first compression chamber, a transfer system that, in an open configuration, is configured to allow the transfer of fluid from the first compression chamber to the second compression chamber, a mobile piston for ensuring the compression of the fluid in the first and second compression chambers, the apparatus also comprising a discharge orifice that communicates with the second compression chamber and is configured to allow the outlet of compressed fluid, the piston being mobile in a translational movement in a longitudinal direction, the first compression chamber being delimited by a fixed lower cavity, a lower end of the piston and a first sealing system formed between the piston and a wall of the lower cavity, the second compression chamber being delimited by a fixed upper cavity, an upper end of the piston and a second sealing system formed between the piston and a wall of the upper cavity.

The invention relates in particular to an apparatus for compressing or pumping cryogenic gases and/or liquids.

Related Art

In the following text, in particular the terms "compression apparatus" and "pump" may be used interchangeably, as may the terms "pumping" and "compression". Specifically, the apparatus that is the subject of the invention is an apparatus for pumping and/or compressing liquid and/or gaseous and/or supercritical cryogenic fluid.

Cryogenic fluids have densities that are much higher than gaseous fluids. Consequently, cryogenic pumps (as opposed to gas compressors) offer higher mass flow rates, a smaller volume, consume less energy and require less maintenance. It is for this reason that cryogenic pumps are used in numerous fields such as units for separating gases from air, reformers, filling stations, maritime sectors.

The fluids in question generally comprise oxygen, nitrogen, natural gas, argon, helium or hydrogen. These compression apparatuses (or pumps) have the function of pressurizing a cryogenic fluid to a target flow rate.

For example, a cryogenic piston pump may be placed directly in line at the outlet of the cryogenic source store or in a dedicated cryogenic bath (also known as a "sump") situated alongside and fed directly by a main storage tank.

For various reasons, in particular the convenience of maintenance and design, the cryogenic pump generally exhibits a reciprocating movement and is inserted into a tank so as to be submerged in the cryogenic fluid to be pumped.

Cryogenic pumps generally have inlet pressures of between 1 and 12 bar and outlet pressures of 20 to 1000 bar, depending on the application. The pumps may have one or more compression stages using a back-and-forth movement.

A mechanism having two compression stages is often preferred because it allows the intake phase (during which the fluid needs to be as dense and therefore also as cold as possible) to be disconnected from the pressurizing phase (in which quantities of heat detrimental to the method may be generated).

The key performance indicators for cryogenic piston pumps are: the volumetric efficiency, the evaporation losses, the energy consumption, the footprint and the durability.

The key features of reciprocating cryogenic pumps should therefore be:
  an intake density that is as high as possible,
  very good thermal insulation with respect to the environment,
  minimum dead volume (and therefore a high compression ratio),
  a simple and robust setup for rapid maintenance and high reliability,
  good control of evaporation losses in order to limit the impact thereof.

Document U.S. Pat. No. 7,410,348 describes a horizontal piston pump with two compression stages with axial intake via a nonreturn valve and radial discharge. This setup exhibits a substantial dead volume. In addition, the leakage losses are relatively high at the two systems of high-pressure seals situated one on either side of the high-pressure chamber.

This also leads to a more difficult setup and more difficult maintenance.

SUMMARY OF THE INVENTION

An aim of the present invention is to overcome all or some of the aforementioned drawbacks of the prior art.

To this end, the compression apparatus according to the invention, in other respects in accordance with the generic definition thereof given in the above preamble, is essentially characterized in that, when the apparatus is in an operating configuration, the longitudinal direction of translation of the piston is vertical, the intake system being situated at a lower end of the apparatus, the discharge orifice being situated in an upper part of the apparatus, above the transfer system.

Furthermore, embodiments of the invention may have one or more of the following features:
  the lower cavity and the upper cavity are distinct entities, the piston comprising an internal duct providing the fluidic connection between the first and second compression chambers,
  the piston is mechanically connected to an actuating member such as a motor and/or a system transmitting movement from a motor, for example, via at least one shaft arranged around the upper cavity and extending in a direction of the longitudinal axis, the transfer system is situated level with the upper end of the piston,
  the second sealing system formed between the piston and a wall of the upper cavity is situated only at the level of the lower end of the second compression chamber and/or below the second compression chamber, the discharge orifice is situated at the level of the upper end of the upper cavity, the apparatus comprising a duct for discharging the compressed gas and comprising a first end connected to the discharge orifice and a second end situated in the upper part of the apparatus, the intake system is situated at a lower end of the lower cavity, the compression of the fluid in the second compression chamber is brought about by an upstroke of the piston, the apparatus is housed in a sealed enclosure containing a bath of cryogenic cooling fluid.

The invention also relates to a station for filling tanks with pressurized gas, comprising a source of liquefied gas, in particular liquefied hydrogen, a withdrawal circuit having a first end connected to the source and at least one second end intended to be connected to a tank that is to be filled, the withdrawal circuit comprising a fluid pumping apparatus or a fluid compression apparatus according to any one of the features above or below.

The invention may also relate to any alternative device or method comprising any combination of the features above or below within the scope of the claims.

BRIEF DESCRIPTION OF THE FIGURES

Further particular features and advantages will become apparent upon reading the following description, which is provided with reference to the figures, in which:

FIG. 1 shows a schematic and partial view in longitudinal and vertical section illustrating the structure of one exemplary embodiment of a compression apparatus according to the invention, FIG. 2 shows a schematic and partial view in longitudinal and vertical section illustrating a first configuration of an operating cycle of the compression apparatus according to the invention, FIG. 3 shows a schematic and partial view in longitudinal and vertical section illustrating a second configuration of an operating cycle of the compression apparatus according to the invention, FIG. 4 shows a schematic and partial view in longitudinal and vertical section illustrating a third configuration of an operating cycle of the compression apparatus according to the invention, FIG. 5 shows a schematic and partial view in longitudinal and vertical section illustrating a fourth configuration of an operating cycle of the compression apparatus according to the invention, FIG. 6 shows a schematic and partial view in longitudinal and vertical section illustrating a fifth configuration of an operating cycle of the compression apparatus according to the invention, FIG. 7 shows a schematic and partial view in longitudinal and vertical section illustrating the structure of another exemplary embodiment of a compression apparatus according to the invention, FIG. 8 shows a schematic and partial view in longitudinal and vertical section illustrating the structure of yet another exemplary embodiment of a compression apparatus according to the invention, FIG. 9 shows a schematic and partial view illustrating an example of a filling station using such a compression apparatus.

DETAILED DESCRIPTION OF THE INVENTION

The fluid compression apparatus 1 depicted in FIG. 1 comprises two compression stages in series.

The apparatus 1 in particular comprises a first compression chamber 3 (at relatively low pressure) and a second compression chamber 4 (at relatively high pressure).

The apparatus 1 comprises an intake system 2 that communicates with the first compression chamber 3 and is configured to allow fluid that is to be compressed to be admitted into said first compression chamber 3. The intake system 2 may comprise for example at least one of: one or more non-return valves, one or more orifices or port(s), at least one flat-disk valve or any other device or valve that allows fluid that is to be compressed to be admitted into the first compression chamber 3 during an intake phase and prevents fluid from leaving in the compression phase. In particular, in one possible embodiment, this system 2 opens in the case of a given pressure difference between its two ends. In addition, the first chamber may possibly be equipped with a relief valve or some other safety element configured to limit the pressure within the chamber to below a given safety threshold.

The apparatus 1 also comprises a system 6 that either (depending on its state) allows or does not allow the transfer of fluid from the first compression chamber 3 to the second compression chamber 4 (during and/or at the end of the phase of compression of the fluid in the first compression chamber 3) but which remains closed during the phase of compression in the second compression chamber 4. This transfer system 6 may be of the same type as that of the intake system 2.

The apparatus 1 comprises a mobile piston 5 capable of translational movement for compressing the fluid in the first 3 and second 4 compression chambers (as detailed hereinafter).

The apparatus 1 also comprises a discharge orifice 7 that communicates with the second compression chamber 4 and is configured to allow fluid compressed in the second compression chamber 4 to leave (during or at the end of the phase of compression in this chamber). The discharge orifice 7 may be provided with a check valve or non-return system, which may be of the same type as that of the intake system 2 (for example closed as long as the pressure difference between the second compression chamber 4 and the outside is below a given threshold).

The first compression chamber 3 is delimited by a fixed lower cavity 14 (for example a cylindrical vessel), a lower end of the piston 5 and a first sealing system 22 formed between the piston 5 and a wall of the lower cavity 14. The intake system 2 may be situated at a lower end of the lower cavity 14.

The second compression chamber 4 is delimited by a fixed upper cavity 24 (for example a cylindrical vessel), an upper end of the piston 5 and a second sealing system 10 formed between the piston 5 and a wall of the upper cavity 24.

The piston 5 is able to move in translation in a longitudinal direction A. When the apparatus 1 is in an operating configuration, the longitudinal direction A of translation of the piston 5 is vertical. The intake system 2 is situated at a lower end of the apparatus 1, the discharge orifice 7 being situated in an upper part of the apparatus 1, above the transfer system 6.

This configuration ensures that fluid that is to be compressed is admitted into the lower part, which is to say into the coldest region of the apparatus 1. In addition, the delivery and any leaks are located in the upper region of the apparatus. This configuration encourages minimal or zero mixing between the two, relatively cold and hot, regions.

This vertical arrangement with a vertical compression stroke allows good separation between the streams of a relatively cold fluid (at the intake) and relatively hot fluid (at the exhaust). In particular, the compression stroke in the second compression chamber 4 is an upstroke (the piston rod 5 being pulled upward and toward the hot part of the apparatus 1).

In particular, this upstroke of the piston 5 during the compression to a high pressure generates a tensile force on the piston rod. This is favorable from a mechanical standpoint This is because under this tensile force, the rod is not subjected to buckling (which it would be under compression/thrust). In addition, this tensile compression arrangement does not require the piston rod to be guided regularly along its length. This also allows the cross-sectional area of the piston rod to be reduced (for example by making the rod hollow or reducing the diameter thereof). In addition, it makes it possible to reduce the length of the piston rod according to the acceptable level of thermal losses.

As has been schematically depicted, the piston 5 can be driven by an actuating member 21 such as a motor situated in the upper part of the apparatus 1.

The piston 5 may be mechanically connected to an actuating member 21 via at least one shaft 23 positioned around the upper cavity 24 (which is to say at least one shaft 23 extending longitudinally around the upper cavity).

For example, several shafts 23 are connected, on the one hand, to a lower end of the piston 5 and, on the other hand, to a plate 27 or support secured to a shaft 26 connected to the actuating member 21.

Of course, the structure is configured to allow the piston 5 a relative sliding motion in the plate 24 (or other support(s)). Thus, for example, the shafts 23 may be configured to slide through a fixed support (not depicted) for retention of the plate 24.

As illustrated, the lower cavity 14 and upper cavity 24 may be distinct physical entities. The piston 5 may comprise at least one internal duct 25 providing fluidic connection between the first 3 and second 4 compression chambers.

The transfer system 6 may be situated at the upper end of the piston 5, for example at the upper end of the internal duct 25 opening into the second compression chamber 4.

As a preference, the second sealing system 10 formed between the piston 5 and a wall of the upper cavity 24 is situated only at the level of the lower end of the second compression chamber 4 and/or below the second compression chamber 4.

This architecture then makes it possible to provide a single high-pressure dynamic sealing system at just one end (the lower end) of the second compression chamber 4.

Thus, this high-pressure sealing system 10 can be situated only at the lower end of the second compression chamber 4 and/or below the second chamber 4.

By contrast, in the prior art mentioned hereinabove, two high-pressure dynamic sealing systems were provided, one on each side of the high-pressure compression chamber (one on each side with reference to the travel of the piston 5).

In comparison with the prior art, this arrangement greatly reduces manufacturing and maintenance constraints and the risk of leaks.

The discharge orifice 7 is situated for example at the level of the upper end of the upper cavity 24. The apparatus 1 may comprise a compressed gas discharge duct 11 comprising a first end connected to the discharge orifice 7 and a second end situated in the upper part of the apparatus 1.

As illustrated in FIG. 1, the compression apparatus may be housed in a thermally insulated sealed enclosure 13 containing a bath 16 of cryogenic cooling fluid. In particular, the first 3 and second 4 compression chambers may be submerged in a liquid phase. The upper part of the enclosure 16 may have a gas headspace which collects any leaks in the apparatus 1.

Thus, the cold head of the apparatus 1 may be submerged vertically in a cryogenic bath 16 (sometimes referred to as a sump).

The first compression chamber 3 could be fixed directly to the bottom of the bath 16.

As schematically depicted, the piston 5 may be driven by an actuating member 21 (for example a motor member 21) situated in the upper part, which is to say that the motor 21 or actuator is situated, along the longitudinal axis A and with respect to the compression chamber 3, on the opposite side to the intake orifice 2 and on the same side as the discharge orifice 7 and the discharge duct 11 (or even beyond this discharge orifice 7.

As illustrated, in the longitudinal direction A, the discharge orifice 7 may be situated between, on the one hand, the intake orifice 2 and, on the other hand, the discharge duct 11 and/or the actuating member 21).

The actuating member 21 (motor or the like) is advantageously situated outside the enclosure 13, in the upper part of the compression apparatus and the two compression chambers 3, 4 inside the enclosure 13.

This also makes it possible to provide a stroke whereby the piston 5 is pulled toward the upper end of the apparatus during the compression phase in the second compression chamber 4.

One example of a compression cycle will now be described in connection with FIG. 2 to FIG. 6.

In FIG. 2, the piston 5 is in the extreme lower position (first compression chamber 3 empty and fluid at a pressure of, for example, between 2 and 20 bar in the second compression chamber 4).

Cold fluid at low pressure (for example from 1 to 10 bar) situated in the bottom of the enclosure 13 may be admitted into the first compression chamber 3 by the intake system 2 as the piston 5 ascends (and the fluid is pressurized in the second compression chamber 4) cf. FIG. 3.

As the piston gradually ascends (FIG. 3), more fluid fills the first compression chamber 3. The fluid in the second compression chamber 4 is compressed. The first compression chamber 3 is filled. When the pressure in the second compression chamber 4 becomes greater than the determined pressure downstream (for example 100 to 1000 bar, depending on the application), the discharge system 7 opens, emptying the high-pressure fluids upward via the discharge duct 11.

In the extreme upper position (FIG. 4), the second compression chamber 4 has emptied and the first compression chamber 3 is full.

After the top dead position (FIG. 5), during the downstroke of the piston 5, because the pressure in the second chamber 4 from the preceding cycle drops below the pressure in the first compression chamber 3, fluid moves from the first compression chamber 3 to the second compression chamber 4 via the transfer system 6 (FIG. 5). When the pressure equalizes after the bottom dead position, the second compression chamber 4 is isolated.

The apparatus returns to the starting configuration and can recommence a cycle (FIG. 6).

This architecture with a compression stroke and separation of the cold (at the bottom) and hot (at the top) parts allows the compression to work better. The relatively long distance between the intake at the bottom and the discharge at the top promotes this advantage.

This is because fluid is admitted at a level where the fluid is at its coldest and most dense whereas the hotter fluids are offset upward. This minimizes the risks of mixing and of ebullition in the bath 16. The hot fluids (leaks) can be collected directly in the upper part without the need for dedicated pipework.

The whole can be housed in a casing.

As a preference, the lower part of the piston 5 has a profile configured to encourage the gas to escape via the ports or valves. For example, as schematically indicated in FIG. 8, one or more ports 126 (or orifices) may be formed in the upper part of the lower cavity 14. These ports 126, when the piston 5 uncovers them (when the piston 5 is above at least part of the ports 126) allow communication between the first compression chamber 3 and the outside. Thus, in the intake phase (as the chamber 3 is enlarging), any gas that might be present in the first compression chamber 3 can escape via these ports 126 and give up its place to liquid from the surrounding bath. This ensures complete filling with liquid during admission. In addition, in the compression phase (the piston 5 moving down in the first compression chamber 3), these ports 126 allow surplus liquid to escape, thereby metering the volume of liquid that will be trapped therein (this volume is determined, for example, by the longitudinal position of the ports 126).

As illustrated, an optional leakage-gas discharge circuit 12 may be provided. For example, the circuit 12 comprises a duct having a first end communicating with the space between the piston 5 and the upper cavity, below the second sealing system 10.

In the alternative form of FIG. 7, flat-disk valves or the equivalent are provided at the lower end of the piston 5 to allow fluid to be admitted into the first compression chamber 3.

In addition, the first chamber may possibly be equipped with a relief valve or some other safety element configured to limit the pressure within the chamber to below a given safety threshold. In the alternative form of FIG. 8, the lower ends of the shafts 23 are connected to an intermediate part of the piston, for example at a ring formed transversally around the body of the piston. This allows the first chamber 3 to be distanced from the second chamber 4 thus better separating the cold fluid that is to be compressed from the hot compressed fluid. The geometry of the lower end of the piston 5, of the first cavity 14 and/or of the second cavity 24 can be adapted to modify the ratio of the volumes of the two compression chambers 3, 4, for example to increase the size of the first compression chamber 3 with respect to the second compression chamber 4.

A compression apparatus 1 of this type (or a plurality in series or in parallel) may be used in any cryogenic installation that requires the pumping or compressing of a cryogenic fluid.

For example, a station for filling tanks with pressurized gas (hydrogen for example) may comprise a source 17 of liquefied gas, a withdrawal circuit 18 having a first end connected to the source and at least one second end intended to be connected to a tank 190 to be filled, the withdrawal circuit 18 comprising such a pumping apparatus 1. The fluid pumped may be vaporized in a downstream exchanger 19 and optionally stored in one or more pressurized buffer tanks 20.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A fluid-compression apparatus with multiple compression stages, comprising:
    a first compression chamber;
    a second compression chamber;
    an intake system that communicates with the first compression chamber and is configured to allow the admission of fluid to be compressed into said first compression chamber;
    a transfer system that, in an open configuration, is configured to allow the transfer of fluid from the first compression chamber to the second compression chamber;
    a mobile piston for ensuring the compression of the fluid in the first and second compression chambers; and
    a discharge orifice that communicates with the second compression chamber and is configured to allow the outlet of compressed fluid, the piston being mobile in a translational movement in a longitudinal direction, wherein:
        the first compression chamber is delimited by a fixed lower cavity,
        a lower end of the piston and a first sealing system formed between the piston and a wall of the lower cavity, the second compression chamber is delimited by a fixed upper cavity, an upper end of the piston, and a second sealing system formed between the piston and a wall of the upper cavity, when the apparatus is in an operating configuration, a longitudinal direction of translation of the piston is vertical, the intake system is situated at a lower end of the apparatus below the discharge orifice, which is situated in an upper part of the apparatus, and the discharge orifice is situated above the transfer system.

2. The apparatus of claim 1, further comprising an actuating member which moves the piston, wherein said actuating member is situated, in the longitudinal direction, in the upper part of the apparatus level with or above the discharge orifice.

3. The apparatus of claim 1, wherein the lower cavity and the upper cavity are distinct entities and the piston comprises an internal duct providing the fluidic connection between the first and second compression chambers.

4. The apparatus of claim 1, wherein the piston is mechanically connected to an actuating member via at least one shaft arranged around the upper cavity and extending in a direction of the longitudinal axis.

5. The apparatus of claim 1, wherein the transfer system is situated at a level with the upper end of the piston.

6. The apparatus of claim 1, wherein the second sealing system formed between the piston and a wall of the upper cavity is situated only at a level of the lower end of the second compression chamber and/or below the second compression chamber.

7. The apparatus of claim 1, wherein:

the discharge orifice is situated at a level of the upper end of the upper cavity; and the apparatus further comprises a duct for discharging the compressed fluid that comprises a first end connected to the discharge orifice and a second end situated in the upper part of the apparatus.

8. The apparatus of claim 1, wherein the intake system is situated at a lower end of the lower cavity.

9. The apparatus of claim 1, wherein the compression of the fluid in the second compression chamber is brought about by an upstroke of the piston.

10. The apparatus of claim 1, wherein the apparatus is housed in a sealed enclosure containing a bath of cryogenic cooling fluid, said enclosure forming part of the apparatus.

11. A station for filling tanks with pressurized gas, comprising:

a source of liquefied hydrogen; and a withdrawal circuit having a first end connected to the source and at least one second end intended to be connected to a tank to be filled, the withdrawal circuit comprising the fluid compression apparatus of claim 1.

* * * * *